June 3, 1952     K. C. D. HICKMAN ET AL     2,599,451
VACUUM BODYING PROCESS
Filed June 4, 1949     2 SHEETS—SHEET 1

KENNETH C. D. HICKMAN
EDWARD S. BARNITZ
INVENTORS

BY *Newton M. Perriso*
*Warren H. Cannon*
ATTORNEYS

June 3, 1952  K. C. D. HICKMAN ET AL  2,599,451
VACUUM BODYING PROCESS
Filed June 4, 1949  2 SHEETS—SHEET 2

KENNETH C. D. HICKMAN
EDWARD S. BARNITZ
INVENTORS

BY
ATTORNEYS

Patented June 3, 1952

2,599,451

UNITED STATES PATENT OFFICE 2,599,451

VACUUM BODYING PROCESS

Kenneth Claude Devereux Hickman and Edward S. Barnitz, Rochester, N. Y., assignors, by mesne assignments, to Eastman Kodak Company, Rochester, N. Y., a corporation of New Jersey Application June 4, 1949, Serial No. 97,207

2 Claims. (Cl. 260—407)

This invention relates to improved process for bodying glyceride oils which contain polymerizable constituents.

It is well known procedure to prepare oils having improved drying properties by subjecting them to a bodying or polymerization treatment. The treatment involves heating the oil to elevated temperature to cause polymerization. Usually inert gases are introduced into the heated chamber in order to prevent oxidation of the oil being bodied. It is also known to carry out this bodying or polymerization treatment under reduced pressure instead of in the presence of an inert gas. See, for instance, U. S. Patents 1,745,877, 1,915,260, and 2,166,539. The vacuum or reduced pressure prevents contact of the oil with the oxygen of the atmosphere and, therefore, prevents oxidation. Also some of the gaseous and like decomposition products formed during the heating are removed by the evacuating pumps. It has been recognized that vacuum treatment gave a somewhat better product than the inert gas treatment. However, the products obtained by the prior art vacuum treatment leave much to be desired.

This invention has for its object to provide greatly improved vacuum bodying procedure. A further object is to provide vacuum bodying procedure which can be applied economically and which will give a high yield of superior bodied oil. Another object is to provide procedure for vacuum bodying soybean oil, simultaneously producing a vitamin fraction and an edible oil therefrom. Another object is to improve the state of the art. Other objects will appear hereinafter.

These and other objects are accomplished by our invention which includes vacuum bodying a glyceride oil by subjecting it to pressure and temperature conditions sufficient to cause relatively slow distillation of non-polymerizable glycerides and particularly thermal decomposition products which would otherwise combine with the glyceride oil to form poor drying constituents resistant to further polymerization, but insufficient to cause substantial distillation of the polymerizable constituents before they become polymerized, and condensing non-polymerizable glycerides and thermal decomposition products which are volatilized during the treatment and preventing their return to the oil being treated.

Glyceride oils, such as vegetable oils and marine oils, normally contain non-polymerizable constituents in admixture with polymerizable constituents. The non-polymerizable constituents commonly encountered include vitamins, sterols and certain glycerides.

Oosterhof disclosed in U. S. Patent 2,065,728 that the removal of the non-polymerizable glycerides after polymerization of the polymerizable constituents was desirable to improve the drying characteristics of the bodied oil. He accordingly bodied glyceride oils in the conventional manner by heating them for several hours at elevated temperatures, and thereafter subjected the bodied oil to high vacuum evaporative distillation from a thin film to remove unpolymerized glycerides.

Barnitz disclosed in U. S. Patent 2,437,343 that the drying characteristics of the bodied oil were further improved by stripping from the oil certain of the unpolymerizable constituents such as vitamins and sterols by high vacuum evaporative distillation before bodying the oil and then distilling the bodied oil as taught by Oosterhof.

Bodying processes are normally carried out at temperatures above 270° C. for several hours. We have found that at such elevated temperatures thermal decomposition of the polymerizable glycerides takes place with the formation of materials such as carbon dioxide, propane, carbon monoxide, aldehydes, unsaturated hydrocarbons and low molecular weight esters.

Thus, for example, glycerides decompose to liberate acrolein. The fatty acid portion of the glycerides splits off unsaturated hydrocarbons as, for example, 1-octane splitting off from oleate chains leaving a low molecular weight glyceride ester.

We have found that the thermal decomposition products and particularly the unsaturated hydrocarbons and unsaturated esters interact with the polymerizable glycerides to form degradation hybrids which resist further polymerization. The resultant bodied oil thus contains polymerized glycerides, unpolymerizable glycerides, and degradation hybrids.

The unpolymerizable glycerides can thereafter be removed by high vacuum evaporative distillation but the degradation hybrids remain in the bodied oil since the evaporative distillation must be carried out under conditions ineffective to cause substantial thermal decomposition of the bodied oil.

We have found, however, that the formation of degradation hybrids is prevented by bodying glyceride oil at elevated temperatures under vacuum effective to distill out thermal decomposition products as they are formed and before such decomposition products can interact with the polymerizable glycerides. Since the unpolymerizable constituents of the glyceride oils originally present in the oils distill more readily than the polymerizable glycerides, part or all of such unpolymerizable constituents can be distilled out at the same time to obviate the necessity of later subjecting the bodied oil to high vacuum evaporative distillation to effect their removal.

The improved drying characteristics of the bodied oils of this invention are readily illustrated by comparison with oils bodied at atmospheric pressure.

A sample of soybean oil containing polymerizable and unpolymerizable constituents was bodied by heating it at 275° C. and atmospheric pressure for 6 hours. A second sample of this oil was heated at 275° C. for 6 hours at a pressure of 7 microns in accordance with this invention.

After incorporation of driers, a film of the oil bodied at atmospheric pressure required 24 hours to dry to a tack-free condition. The oil bodied in accordance with this invention dried to a tack-free condition in 5 hours.

Further evidence that the improvement in drying oils prepared in accordance with this invention is due to removal during bodying of thermal decomposition products rather than mere distillation out of unpolymerizable constituents originally present in the oil is furnished by the following example.

A sample of soybean oil was distilled on a high vacuum centrifugal still during which time approximately 7% by weight of the oil was stripped out, leaving a stripped residue substantially free of vitamins, sterols and the like.

The resulting stripped soybean oil was thereafter divided into two portions. Sample 1 was bodied by heating it at 280° C. for 6 hours at atmospheric pressure. Sample 2 was bodied in accordance with this invention by heating it at 280° C. for 6 hours at a pressure of 12 microns.

The resulting bodied oils were then subjected to high vacuum centrifugal distillation until in each case, the residue amounted to 50% of the original oil. Sample 1 prepared in accordance with conventional practice, after incorporation of driers, dried to a tack-free film in 5 hours and a dust-free film in 8 hours. Sample 2 prepared in accordance with this invention and tested in similar fashion dried to a tack-free film in 2 hours and to a dust-free film in 3½ hours.

During the final evaporative distillation, 11% of sample 2 was stripped out with 32% distillate being removed during the vacuum bodying process. In the case of sample 1, 43% of the bodied oil was removed by evaporative distillation.

In order to determine the effect of high vacuum evaporative distillation on polymerization, a sample of unbodied soybean oil was subjected to high vacuum distillation as in the case of samples 1 and 2 and the resulting residue and distillate recombined. No significant increase in viscosity was noted and there was no evidence of polymerization taking place during the short distillation period.

Our invention, therefore, enables the polymerization of wanted constituents with the simultaneous distillation and elimination of unwanted constituents.

We have found by experiment that the range of pressure over which simultaneous bodying and distillation can occur is quite large and extends from a micron or less on the low side to about a millimeter on the high side, with a preferred operating region of 10 to 200 microns. It is contemplated that conditions will be adjusted so that the design of apparatus in regard to the space for travel of vapors and the pressure employed compensate one another to the point of eliminating just the right quantity of unpolymerized distillate during the treatment of a given quantity of oil.

This separation may be performed in the lower portion of the pressure range mentioned by maintaining a large quantity of oil in the bodying kettle and exposing a small surface area of the oil for the escape of vapor. Alternatively, pressures in the higher portion of the above range are employed when there is a relatively small quantity of oil in the kettle and a large rapidly evaporating surface is exposed for the escape of vapor. In between these two extremes we contemplate, according to our invention, the use of fractionating plates, rotating brushes, and other fractionating devices which are designed to facilitate the removal of the unwanted constituents and to retain the wanted constituents in the bodying kettle. The preferred temperature depends upon the foregoing factors and the kind of oil being treated. In general a temperature between 270° and 375° C. will be most useful.

The process of our invention is applicable to glyceride oils whether synthetic or natural which contain polymerizable constituents. It is of particular value in connection with oils having an iodine number of above about 120. Examples of oils which can be improved by our invention are linseed, soybean, oiticica, sardine, and menhadin oils. Our invention is of particular value for improving fish oils. These oils are available on the market in large amounts. However, they are unsatisfactory for use as drying oils in their natural condition. Our invention is also of particular value in connection with the improvement of soybean oil. For some reason the improvement obtained by the treatment of soybean oil is much greater than that obtained by the treatment of other oils. Also, the matter volatilized from soybean oil constitutes a valuable edible oil containing at least its normal complement of vitamins. There are definite advantages in first subjecting the oil to a high vacuum or molecular distillation to remove vitamins, sterols, and other valuable substances, and also to remove a fraction of the oil which has non-drying or poor drying properties. This operation may be carried out in the vacuum bodying apparatus. The procedure of our invention may also be preceded by any well known solvent extraction process for concentrating the drying constituents of a glyceride oil. However, it is to be understood that our invention is not limited to these modifications.

It has been noted that when polymerization starts, vast amounts of gases and volatile matter are given off. A large portion of the volatile matter is condensed upon the condensing surface. This is a glyceride condensate which can be used as a valuable oil. However, much of the matter thus given off is gaseous and, therefore, is not condensed on the condensing surface and must be handled by the pumps. For this reason pumps having a large pumping capacity should be employed.

The treatment requires several hours and should be continued until the oil has acquired the desired characteristics. In general, the longer the treatment is continued the better the properties of the residue. However, for most purposes a period of two to twelve hours will be satisfactory. This corresponds with a removal of about 20% to 80% of the oil in the form of volatilized matter.

In the accompanying drawings wherein like numbers refer to like parts, we have illustrated improved apparatus in which our vacuum bodying treatment can be carried out. Referring to the drawings.

Figure 1:
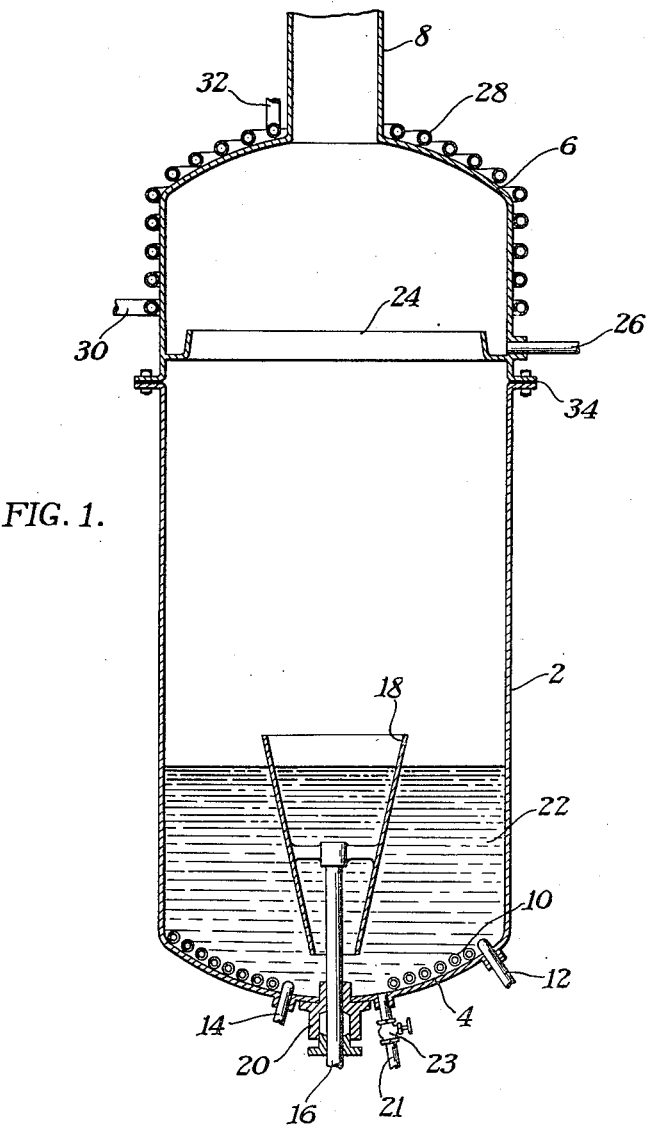
Fig. 1 illustrates a vertical section of suitable apparatus in which our invention may be carried out which is provided with relatively little obstruction between the vaporizing and condensing zones.

Referring to Fig. 1, numeral 2 designates a cylindrical casing provided with an integral base 4 and a removable cover 6 which is provided with an evacuating conduit 8 leading to evacuating pumps (not shown). Numeral 10 designates a heated coil in the base of cylindrical casing 2 through which heating fluid is circulated by way of introduction conduit 12 and withdrawal conduit 14. Numeral 16 designates a shaft upon which is mounted a truncated conical element 18 and which is rigidly but rotatably mounted in packed gland 20. Numeral 22 designates glyceride oil to be treated. Numeral 24 indicates an annular collar integral with the wall of cover 6 and numeral 26 a withdrawal conduit for removing liquid collected in gutter 24. Numeral 28 designates a cooling coil for cooling the cover. Cooling fluid is introduced through conduit 30 and removed through conduit 32. A gas tight connection between cover 6 and casing 2 is obtained by means of a gas tight gasket and flange 34. Oil is introduced into and withdrawn from the apparatus through conduit 21 and valve 23.

Figure 2:
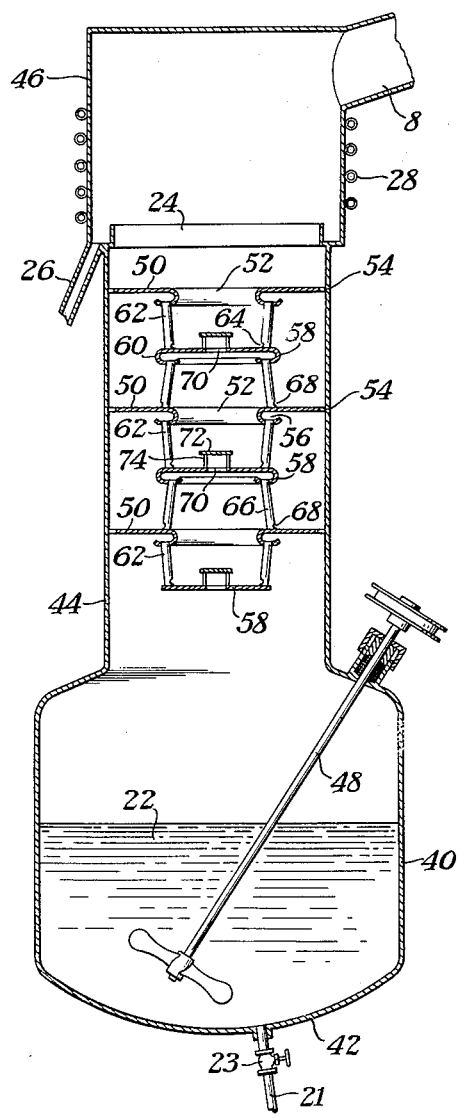
Fig. 2 is a vertical section of apparatus similar to Fig. 1 but provided with widely spaced fractionating plates for fractionating the vaporized glycerides during the vacuum bodying treatment.

Referring to Fig. 2, numeral 40 designates a reservoir for the glyceride 22 which is to be treated. The reservoir is provided with a base 42 and is integral with a cylindrical fractionating column 44, which terminates in a condensing chamber 46, which is connected to evacuating conduit 8. The condensing chamber is provided with cooling coils 28 and with a gutter 24 for collecting condensate. The liquid to be bodied is agitated during treatment by means of stirrer 48.

The fractionating column 44 is of known design and its operation is described in detail in Hickman, 2,176,498, October 17, 1939. Numeral 50 designates circular plates integral with the wall of 44 having a large opening 52 in the center thereof and a number of small openings 54 at the periphery thereof. The central portion of each plate is provided with a downward and outwardly turned lip which forms a gutter 56. Numeral 58 designates a circular plate somewhat larger in diameter than openings 52 which is provided at the periphery with a gutter 60. Numeral 62 designates a plurality of conduits serving to drain liquid from gutters 56 and introduce it onto the top surface of plates 50 through openings 68. Numeral 70 designates a circular opening in the center of plates 58 which is provided with a small baffle or cap 72 maintained in the position shown by support 74.

Figure 3:
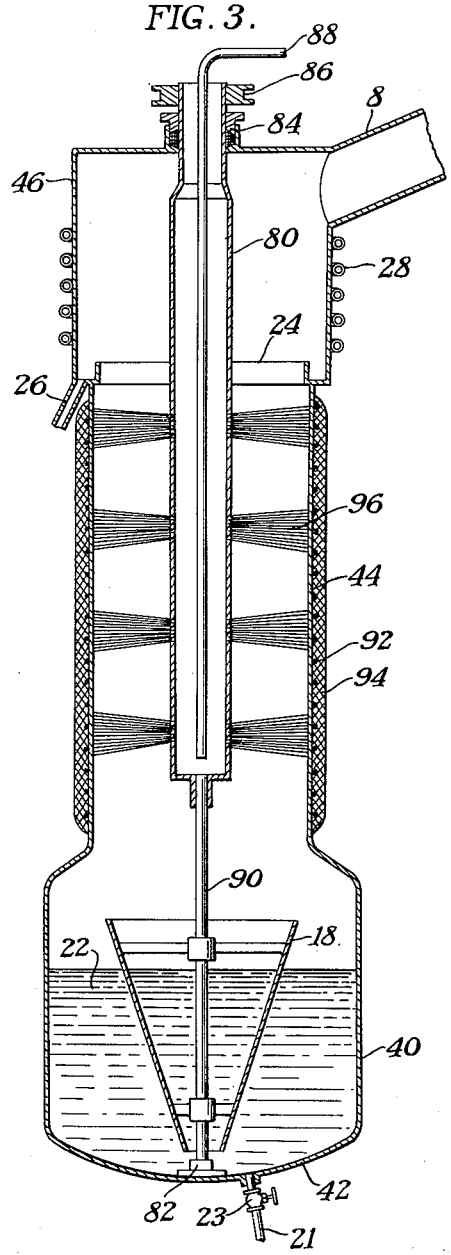
Fig. 3 is a vertical section of apparatus provided with a rotating brush serving to fractionate the vapors somewhat more efficiently than the plates illustrated in Fig. 2.

Referring to Fig. 3, numeral 80 designates a shaft positioned in the center of the apparatus and rigidly maintained in this position by bearing 82 and packed gland 84. The shaft is rotatably mounted and is driven by pulley 86. The upper portion of the shaft is hollow and into this hollow portion protrudes conduit 88 through which cooling fluid is introduced. The lower portion of the shaft terminates in a solid rod 90 upon which is mounted stirrer or centrifugal pump 18. Numeral 92 designates an electrical heating coil provided with an insulating blanket or lagging 94. Numeral 96 designates a plurality of bristles such as a wire brush which preferably make contact with the inside wall of fractionating column 44.

In operating the apparatus illustrated in Fig. 1, the glyceride oil to be vacuum bodied is introduced through conduit 21. Valve 23 is then shut. The evacuating pumps connected to conduit 8 are put into operation, shaft 16 is rotated and heating fluid is introduced into heating coil 10. The oil 22 is continuously drawn up the inside wall of the truncated cone 18 and spills over the upper edge thereof. There is thus a continuous agitation of this liquid. Cooling fluid is circulated through conduit 28. Vapors generated from liquid 22 pass upwardly and are condensed on the walls of cover 6. The condensate flows by gravity into gutter 24 and is withdrawn from the bodying apparatus by way of conduit 26. The treatment is continued until the oil 22 has the desired characteristics. The treatment is then terminated, the oil is withdrawn through conduit 21 and valve 23, and a fresh charge can then be introduced into the still and the operation repeated.

In operating the apparatus illustrated in Fig. 2, the system is evacuated through conduit 8. Pot or reservoir 40 is heated to a suitable temperature, stirrer 48 is put into operation and cooling fluid is circulated through 28. Vapors of glyceride which are generated pass in a zigzag path between plates 58 and 62. Liquid condensate collects on these plates and is caused to flow thereover in a thin film from one plate to another by the blowing action of the vapors passing upwardly. There is thus an upward passage of vapors and a downward passage of condensate in the form of a thin film with interchange and efficient fractionation. Fractionated vapors are condensed on the inside wall of condensing chamber 46, flow into gutter 24 and are withdrawn through conduit 26.

In operating the apparatus illustrated in Fig. 3, the equipment is put into operation as described above in connection with Fig. 2. Shaft 80 is caused to rotate, liquid 22 is drawn up the inside wall of gutter 18 and spills over the top thereof thus causing efficient stirring and renewal of the vapor surface. The vapors are partially condensed and the liquid condensate is thrown by centrifugal force against the outside wall which is heated by 92. Lighter portions of this liquid are vaporized and pass upward where they are again condensed. The liquid condensate is thus contacted in thin films with the vapors passing upward and there is repeated fractionation so that the vapors arriving in the condensing chamber 46 are the desired fractions only. These vapors are condensed and withdrawn from gutter 24 as previously described.

A gentle current of steam or inert gas may be introduced into the treated oil during the process. However, the pressure should be maintained within the range specified, so that the amount of gas or vapors thus introduced must be small unless the pumping capacity is exceedingly high.

The following examples indicate the results obtained. In each example the apparatus used was similar to that illustrated in Fig. 1.

*Example 1.*—Sardine oil from which most of the vitamins and sterols have been stripped by molecular distillation was heated with agitation for six hours at 280–290° C. while subjected to a vacuum of 7–12 microns. A distillate corresponding to 30% of the charge was withdrawn. The distillate was found to be high in fatty acids, was solid at room temperature and was relatively non-polymerizable. It also contained other decomposition products. The residual oil was of high viscosity, light in color, and had decidedly improved drying oil properties.

*Example 2.*—A stripped sardine oil was heated at a temperature between 280–290° C. under a vacuum of 2–13 microns until the residue had reached a viscosity of 5 poises absolute at 25° C. From this point on the maximum amount of distillate was removed, amounting to 13.2% of the charge. During both states the temperature range was 280° to 290° C. The pressure was from 6 to 18 microns. The resulting final residue was a good drying oil.

*Example 3.*—Sardine oil from which 30% distillate had been removed was treated in the same manner as that in above Example 1. After six hours at a temperature of 285° C. in a vacuum of 6–30 microns a 61% residue was obtained that had drying oil properties which were much better than a control sample.

*Example 4.*—Soybean oil that had been stripped of vitamins and sterols by molecular distillation was treated by vacuum bodying at 280–300° C. for ten hours at a pressure of 9 microns. During this period 55% distillate was removed during the polymerization process. The distillate was clear liquid consisting mainly of fatty acids, decomposition products, relatively non-polymerizable products and triglyceride. The residual oil had a viscosity of 6 poises absolute at 25° C., was clear, light yellow in color, and had decidedly unique drying oil properties.

*Example 5.*—Soybean oil was stripped and treated in the same manner as in Example 4, except that the vacuum bodying process was continued for 3 hours longer, during which time an additional 5% distillate was removed. The resulting residue had better drying oil properties than the oil obtained in Example 4.

*Example 6.*—Soybean oil that had been given the usual alkali refining was placed in the bodying still shown in Fig. 1 and the pressure reduced to $10\mu$ whilst the temperature was raised slowly to 260°. During this interval a distillate was removed which contained substantially all the removable tocopherols, sterols, and essential oils. The temperature was then raised to 280–310° C. for 16 hours at a pressure ranging between 20 and $800\mu$. During this period 50% of distillate was removed. The distillate was a clear liquid consisting mainly of fatty acids, cyclized glycerides, relatively non-polymerizable products, and relatively saturated triglyceride fat. The residual oil had a viscosity of 10 poises absolute at 25° C., was clear, light yellow to pale brown in color, and had decidedly unique drying oil properties.

*Example 7.*—Linseed oil was stripped of its vitamins and sterols by molecular distillation and then vacuum bodied for seven hours at 270–295° C. and 30 microns pressure. The resulting residue amounted to 53% of the original oil and was an excellent drying oil.

The properties of the products of the above examples are shown in table I where these properties are compared with the properties of ordinary heat polymerized sardine, linseed and soybean oils which serve as controls.

*Table I*

| | Percent Original oil | Drying Time Hrs. to Dust Free | Sward Hardness | Adhesion | Water Resistance | Alkali Resistance |
|---|---|---|---|---|---|---|
| Heat polymerized sardine | 100 | (1) | 0 | (2) | v. poor | v. poor. |
| Heat polymerized linseed | 100 | 8 | 0 | 2 | poor | poor. |
| Heat polymerized soybean | 100 | 24 | 0 | (2) | do | v. poor. |

| | Percent Original Oil | Drying Time Hrs. to Dust Free | Sward Hardness | Adhesion | Water Resistance | Water Resistance |
|---|---|---|---|---|---|---|
| Example 1 | 67 | 6 | 2 | 26 | good | fair. |
| Example 2 | 82 | 3 | 3 | 8 | fair | Do. |
| Example 3 | 61 | 5 | 15 | 17 | good | Do. |
| Example 4 | 40 | 7 | 2 | 5 | do | good. |
| Example 5 | 35 | 4 | 9 | 6 | do | Do. |
| Example 6 | 53 | 3 | 6 | 14 | do | fair. |

1 Always retains slight tack.
2 Gummy.

The drying characteristics of the oils were determined after 0.2% lead, 0.05% manganese and 0.005% cobalt had been added in the form of naphthenate driers. Drying time was determined by casting a film 0.001" thick on a smooth surface and allowing it to dry at 25° C. and 50% relative humidity. When drawing the finger across the surface of the film shows no effect, the film was considered dry. Hardness was obtained by the sward rocker, as outlined in the 9th edition of Gardner's "Physical and Chemical Examination of Paints, Varnishes, Lacquers and Colors." Adhesion (a relative value) was determined by a knife-scraping method. Water resistance consisted of immersing a 48-hour-old film in distilled water and inspecting it at various intervals for changes that appear. Alkali resistance was the same but 1% NaOH solution was used in place of water.

Similarly improved results are obtained with other vegetable and marine oils vacuum bodied in accordance with this invention.

While the invention has been described in considerable detail with reference to certain preferred embodiments thereof, it will be understood that variations and modifications can be effected within the spirit and scope of the invention as described herein and defined in the appended claims.

This application is a continuation-in-part of our abandoned application Serial No. 541,254, filed June 20, 1944, which was pending when the present application was filed but thereafter was abandoned.

What we claim is:

1. The process of bodying a substantially unpolymerized glyceride oil containing polymerizable constituents polymerizing at a temperature of 270°–375° C., which process comprises heating a body of said substantially unpolymerized glyceride oil to a temperature of 270°–375° C., maintaining said oil at said temperature for a period of 2–12 hours, and subjecting said oil substantially throughout said period to a pressure below 1 mm., said temperature and pressure being correlated to cause distillation of said oil effective to remove thermal decomposition products as said products are formed and to remove unpolymerizable constituents originally present in said oil and thereby to reduce said oil to from 20–80% of its original weight.

2. The process of improving the drying characteristics of an unpolymerized soybean oil which comprises heating a body of said soybean oil to a temperature of 280°–300° C., maintaining said soybean oil at said temperature for a period of from 2–12 hours, and continuously removing from said soybean oil thermal decomposition products forming during said heating and unpolymerizable constituents originally present in said soybean oil by subjecting said soybean oil substantially throughout said period to a pressure below 200 microns, said time, temperature and pressure being correlated to effect a reduction of from 30–60% in the weight of said oil and to effect substantially complete polymerization of said thus-reduced oil.

KENNETH CLAUDE
DEVEREUX HICKMAN.
EDWARD S. BARNITZ.

REFERENCES CITED

The following references are of record in the file of this patent:

UNITED STATES PATENTS

| Number | Name | Date |
|---|---|---|
| 2,065,728 | Oosterhof et al. | Dec. 29, 1936 |